J. F. HOAG & W. THOMAS.
SHEET SHAPING AND BENDING MACHINE.
APPLICATION FILED OCT. 24, 1911.
1,041,471.
Patented Oct. 15, 1912.
7 SHEETS—SHEET 1.
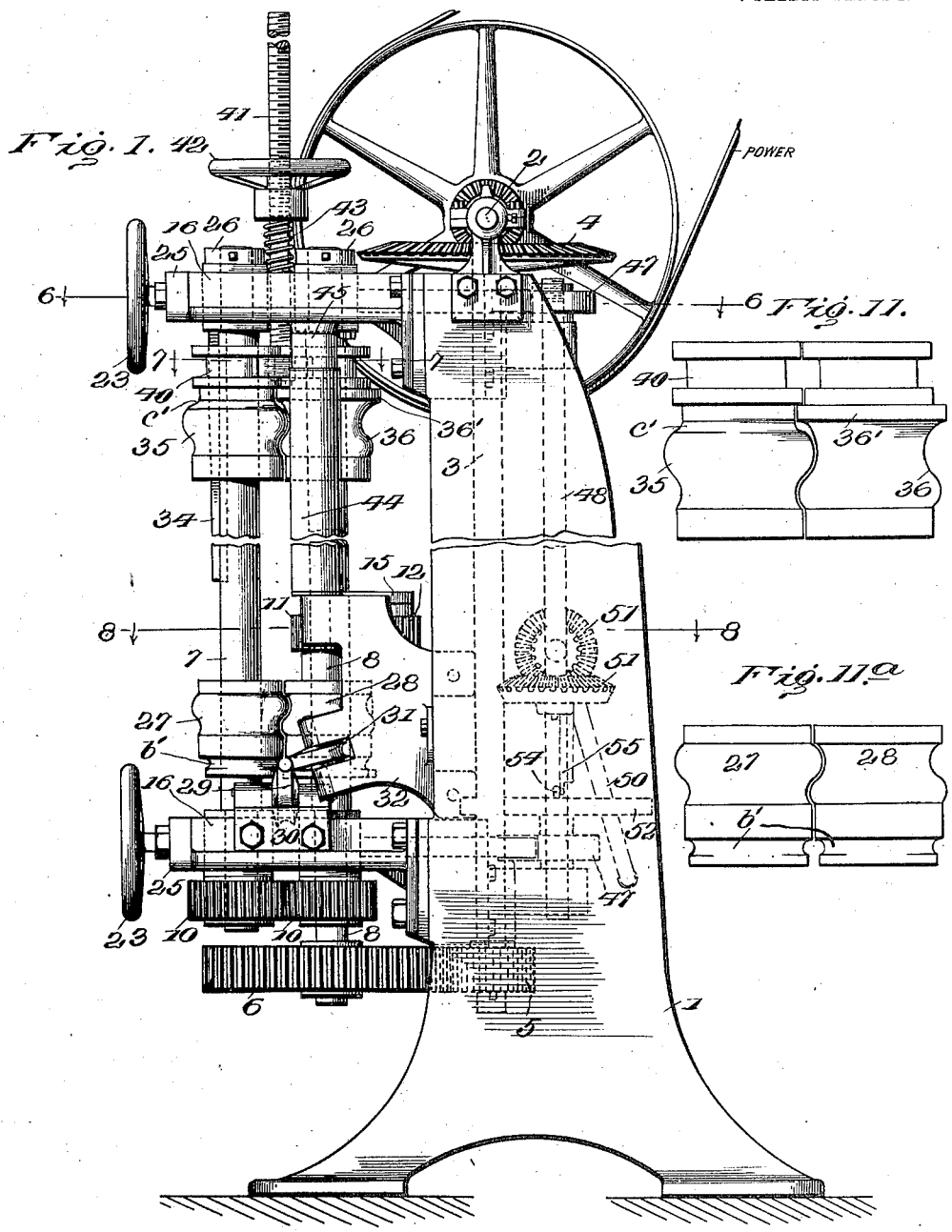
WITNESSES:
W. A. Williams
E. R. Peek
INVENTORS
John F. Hoag
William Thomas
BY
Hulut & Peck, Attorney

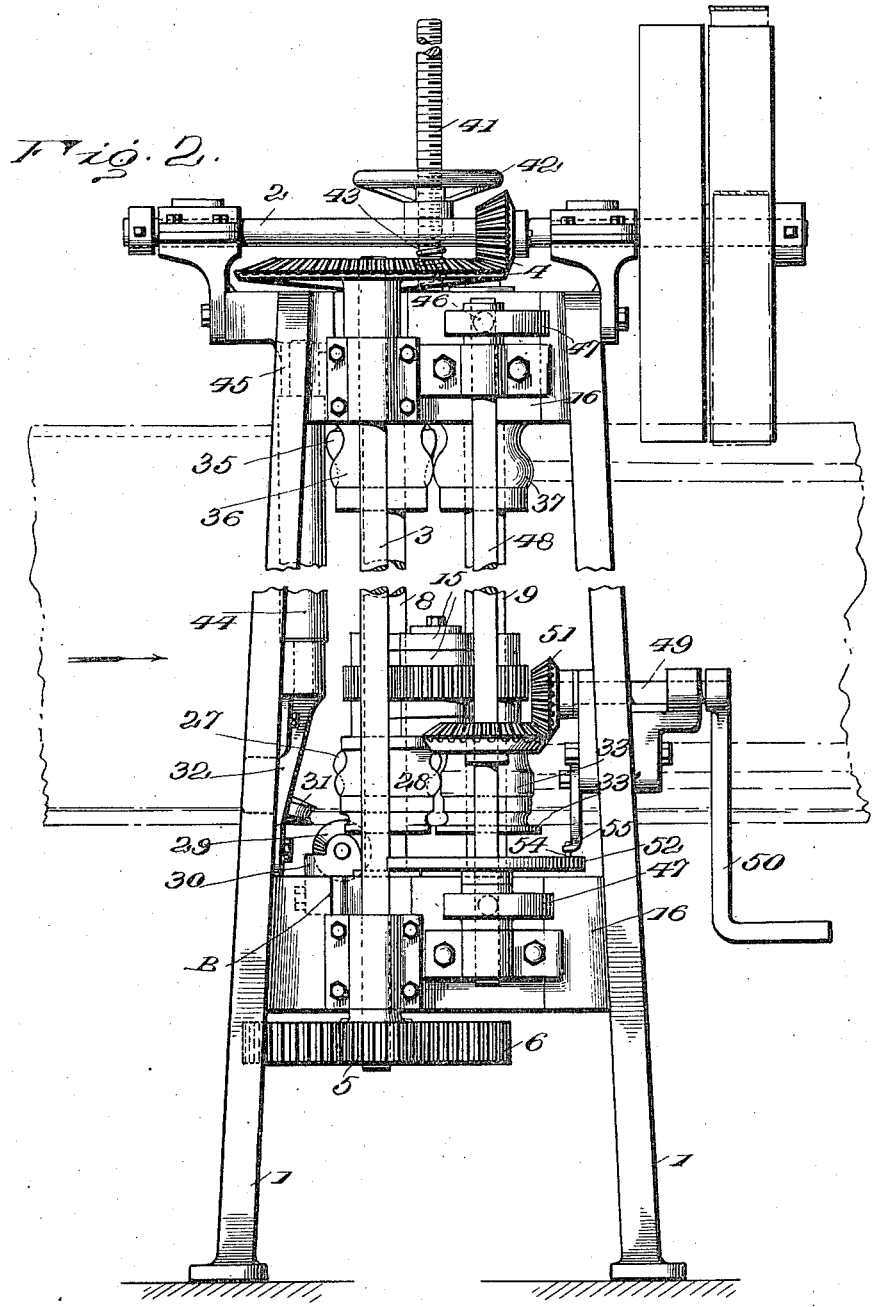

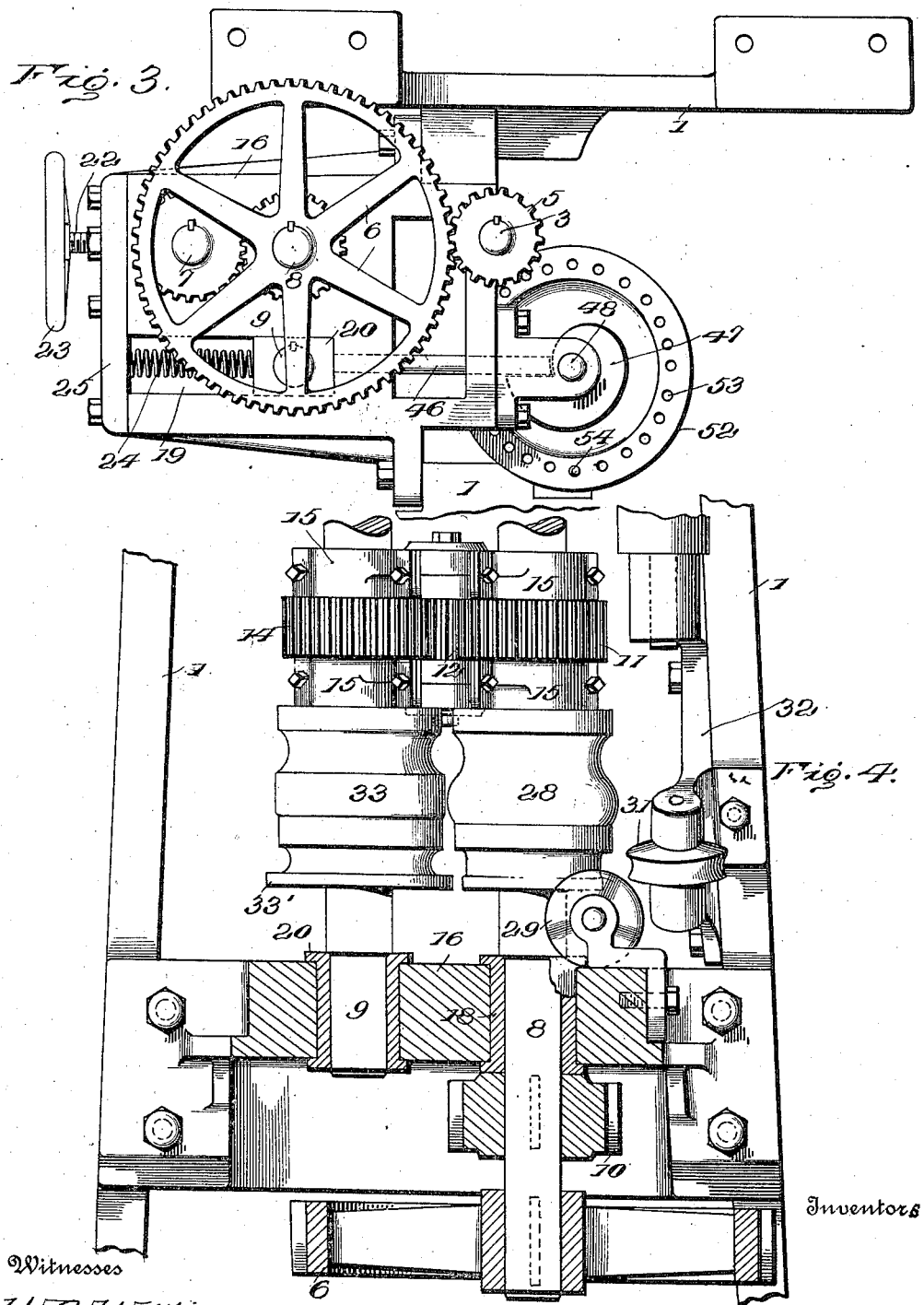

J. F. HOAG & W. THOMAS.
SHEET SHAPING AND BENDING MACHINE.
APPLICATION FILED OCT. 24, 1911.
1,041,471.
Patented Oct. 15, 1912.
7 SHEETS—SHEET 4.
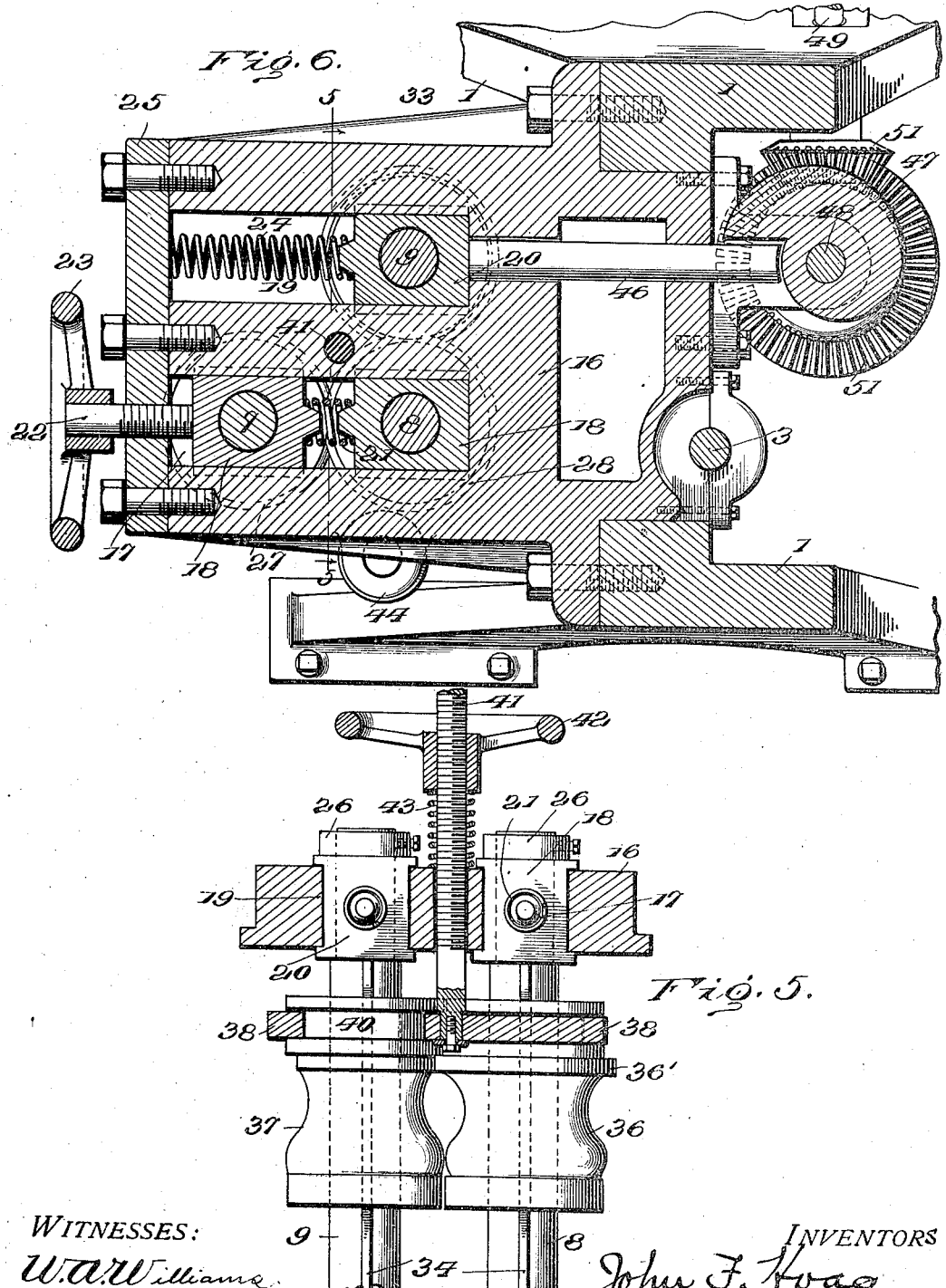

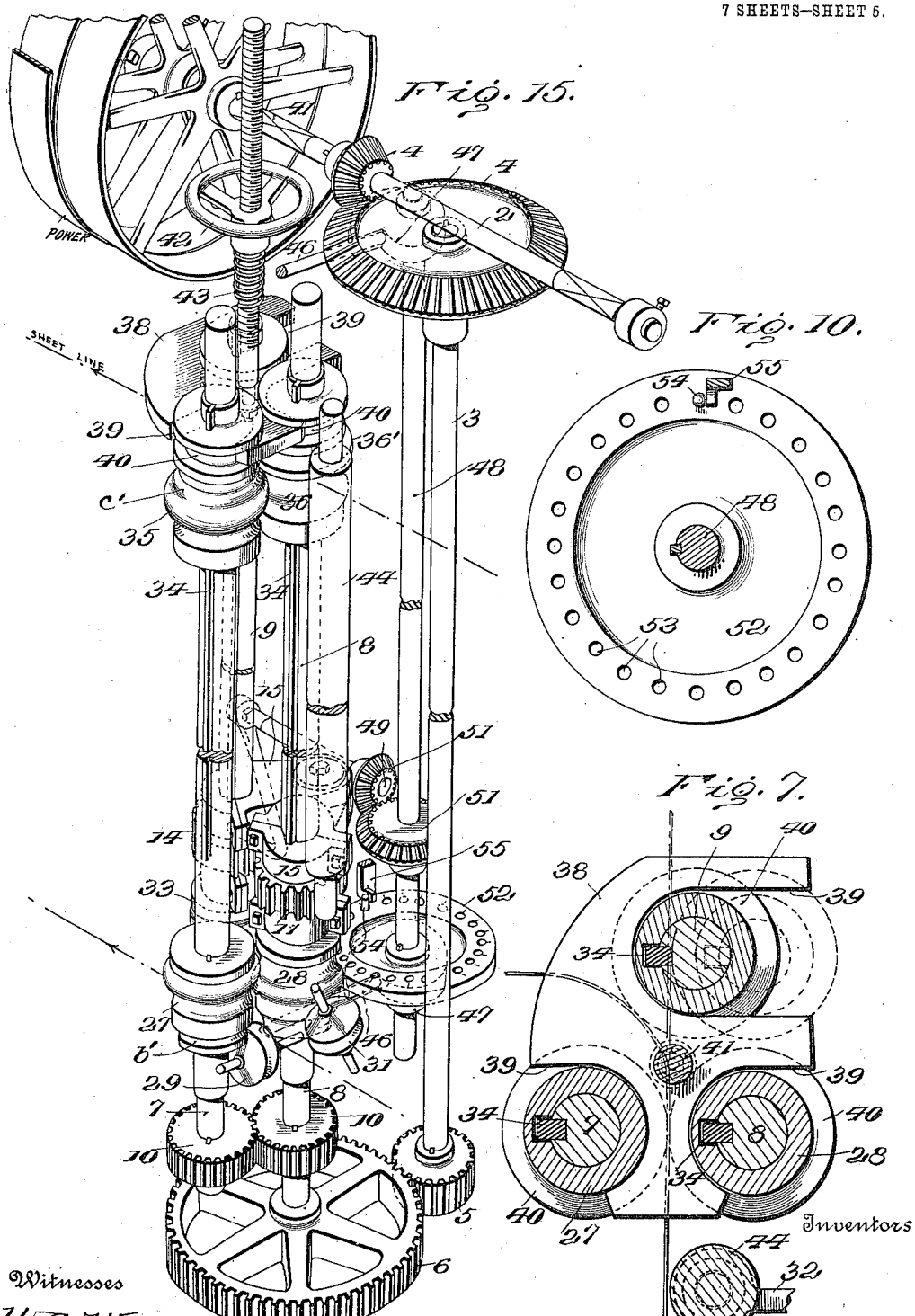

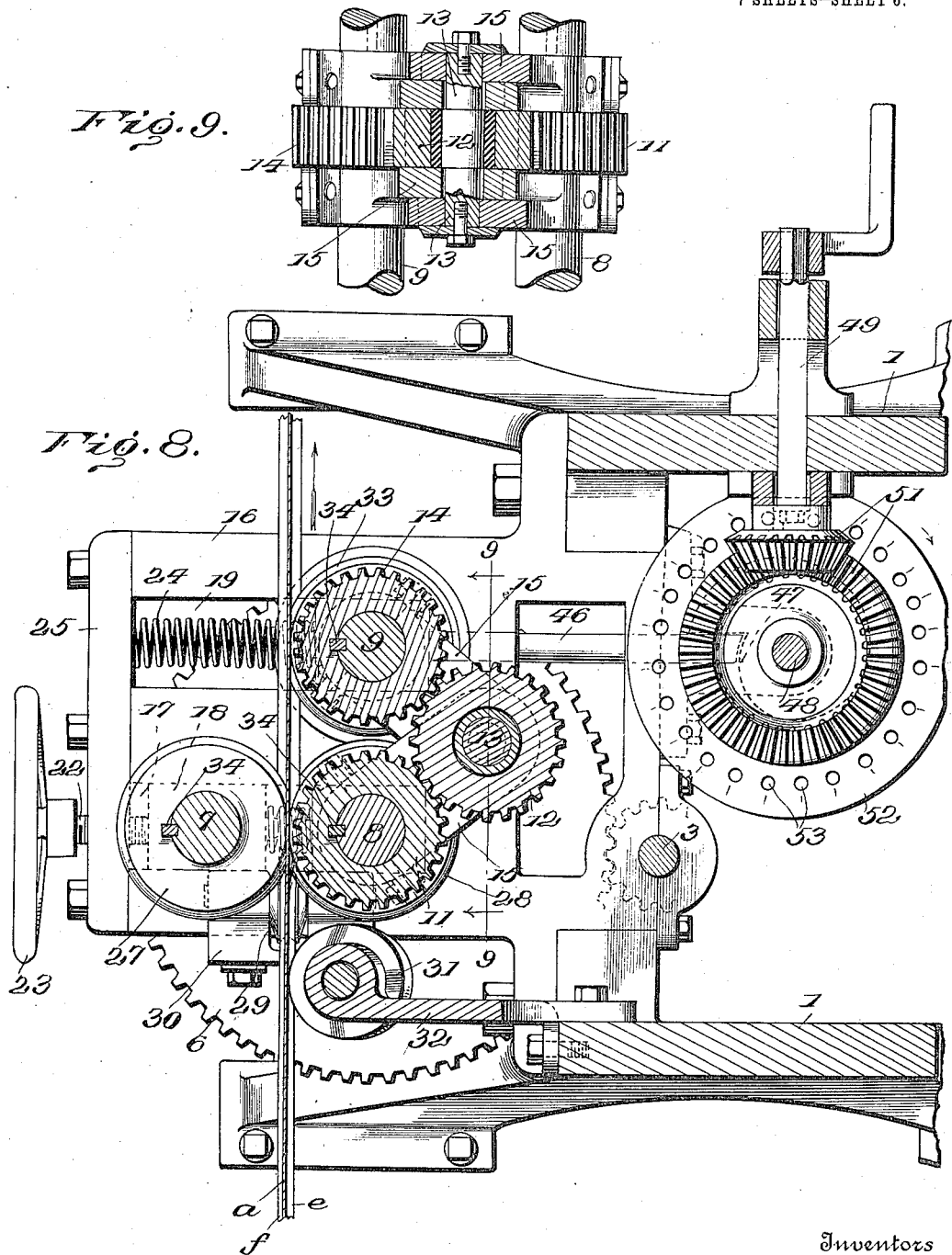

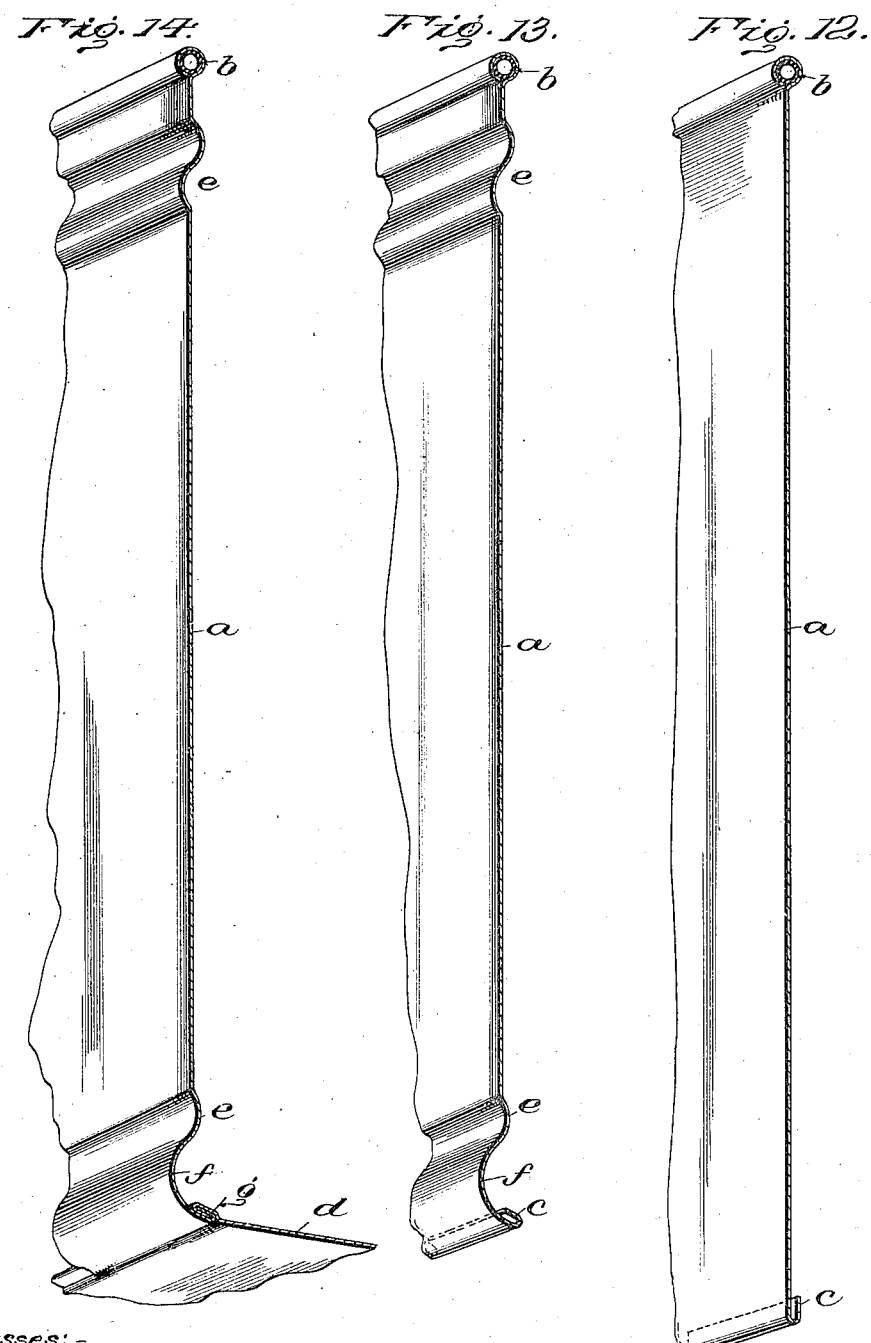

UNITED STATES PATENT OFFICE.

JOHN F. HOAG AND WILLIAM THOMAS, OF BEATRICE, NEBRASKA, ASSIGNORS TO DEMPSTER MILL MANUFACTURING COMPANY, OF BEATRICE, NEBRASKA, A CORPORATION OF NEBRASKA.

SHEET SHAPING AND BENDING MACHINE.

1,041,471.      Specification of Letters Patent.      Patented Oct. 15, 1912.

Application filed October 24, 1911. Serial No. 656,421.

*To all whom it may concern:*

Be it known that we, JOHN F. HOAG and WILLIAM THOMAS, citizens of the United States, residing at Beatrice, in the county of Gage and State of Nebraska, have invented certain new and useful Improvements in and Relating to Sheet Shaping and Bending Machines, of which the following is a specification.

This invention relates to certain improvements in machines for corrugating or otherwise bending and shaping metal sheets; and the objects and nature of the invention will be readily understood by those skilled in the art in the light of the following explanation of the accompanying drawings illustrating what we now consider to be our preferred embodiment from among other formations and arrangements within the spirit and scope of the invention.

An object of the invention is to provide improved mechanism for simultaneously rolling the opposite longitudinal portions of metal sheets to corrugate or otherwise shape said portions thereof, and to provide adjusting means whereby said mechanism can be adapted to sheets of different widths.

A further object of the invention is to provide an improved sheet metal rolling machine for longitudinally corrugating or otherwise shaping metal sheets, capable of quick and easy adjustment for the production of such sheets flat throughout their lengths, or curved throughout their lengths, or partially flat and partially curved.

A further object of the invention is to provide a machine for longitudinally corrugating or otherwise shaping sheet metal, readily adjustable to operate on sheets of different widths, and also adjustable while in action to longitudinally curve or bend a sheet wholly or partially into rounded or circular form, or to produce the corrugated or otherwise shaped sheet in flat form.

A further object of the invention is to provide a machine to receive flat metal sheets throughout one longitudinal edge formed into a stiffening roll or tube, and to longitudinally curve such sheets into circular form throughout, or only partially throughout the length thereof, and to provide such machine with guiding thrust receiving means for the reception of such rolled or tubular edges.

A further object of the invention is to provide a machine for receiving flat metal sheets, each at one longitudinal edge formed into a stiffening roll or tube and at the opposite longitudinal edge doubled into a seam forming hook, and to longitudinally roll and corrugate or otherwise shape longitudinal portions of such sheets without mutilating or unduly distorting such rolled and bent edges, to produce sheet metal vertical walls for round, parallel-side, or parallel-side and rounded end tanks.

A further object of the invention is to provide certain improvements in adjustments, and in arrangements and combinations of parts whereby a highly efficient machine will be produced for economically rolling and shaping metal sheets.

The invention consists in certain novel features in construction and in combinations and arrangements of parts and elements as more fully and particularly set forth hereinafter.

Referring to the accompanying drawings:—

Figure 1, is a side elevation of a machine embodying the features of our invention, the view being taken from the inlet or sheet-receiving side of the machine, various parts being indicated by dotted lines. Fig. 2, is a rear elevation, dotted lines indicating the path of the sheets through the machine when straight shaped sheets are being produced thereby. Fig. 3, is a bottom plan view of the machine, parts being broken away. Fig. 4, is a vertical sectional view of the lower portion of the machine, taken in a plane parallel with the path of the sheets through the machine, the lower right hand shaping roll and the lower sheet curving or bending roll appearing in side elevation. Fig. 5, is a vertical sectional view of the upper portion of the machine taken in the plane of the lines 5—5, Fig. 6. Fig. 6, is a horizontal section taken in the plane of the line 6—6, Fig. 1. Fig. 7, is a detail horizontal section taken in the plane of the line 7—7, Fig. 1, dotted lines indicating the path of a sheet when being produced in straight form, and also the path of a sheet when being produced in curved form, and the corresponding positions of the bending or curving rolls. Fig. 8, is a horizontal section taken in the plane of the line 8—8, Fig. 1, a sheet being shown passing through the machine in straight form. Fig. 9, is a detail vertical section taken in the plane of the line 9—9, Fig. 8. Fig. 10, is a detail plan of the index disk, certain coöperating parts being shown in cross section. Fig. 11, is a detail elevation of the upper coöperating shaping or corrugating rolls. Fig. 11ª, is a detail elevation of the lower coöperating shaping or corrugating rolls. Fig. 12, is a sectional perspective view of a straight sheet as prepared in readiness for passing through the machine of our invention. Fig. 13, is a sectional perspective of the sheet after it has been passed through and shaped by the machine. Fig. 14, is a sectional perspective of a portion of a tank into which the sheet of Fig. 13, has been incorporated to form the vertical or surrounding tank wall. Fig. 15, is a perspective view of the working or operative parts of the machine, the frame work and certain supporting parts not being shown.

In the drawings, we show a strong rigid upright main frame comprising two parallel spaced side pieces 1, suitably fixed together.

2, is a horizontal shaft mounted in suitable boxes on the upper end of the main frame and provided with fast and loose pulleys for the reception of a driving belt.

3, is a vertical rotary shaft extending approximately throughout the height of the main frame and arranged at the rear portion thereof and mounted in suitable boxes carried thereby. Shaft 3, is geared to and driven by the horizontal shaft 2, through the medium of bevel gearing 4. At its lower end, this vertical drive shaft carries a pinion 5, fixed thereto and meshing with and driving gear 6, on the lower projecting end of one of the roll shafts. At the receiving side of the machine, two vertical parallel roll shafts 7, 8, are arranged, and in rear thereof (in the direction of movement of the sheets through the machine) is arranged another vertical roll shaft 9. The right hand roll shaft 8, has the driving gear 6, fixed to its projecting lower end, and the left hand roll shaft 7, is geared to and positively rotated with the shaft 8, through the medium of meshing gears 10, on the lower end portions of said two shafts.

As fully explained hereinafter, the shaft 9, is bodily adjustable in a vertical plane intersecting the vertical plane in which the metal sheets move in passing between the shafts 7 and 8, and as it is desirable to positively rotate shaft 9, whatever its position, an expansion gear connection is provided between shafts 8 and 9, whereby shaft 9, will constantly rotate with and in the same direction as shaft 8. This expansion gear connection is arranged to the right, and out of the way, of the path of movement of the work, metal sheets, between roll shafts 7, 8, and is located intermediate the lengths of said shafts, usually between the upper and lower sets of rolls driven by said shafts and hereinafter explained. In the specific example illustrated, this expansion driving connection comprises a gear 11, fixed on shaft 8, and in mesh with and driving an intermediate gear 12, on short vertical idler shaft 13, and a gear 14, fixed on shaft 9, and in mesh with and driven by gear 12, and hence constantly rotating shaft 9, with and in the same direction as shaft 8. The idler shaft 13, and the intermediate gear 12, are supported by, and the gear 12, is held in constant operative mesh with, gears 11, 14, by two pairs of horizontal swingable links 15, overlapping and pivotally joined at their free ends by the shaft 13. The gear 12, is arranged between the overlapping ends of said links. The links of one pair are arranged above and below the gear 11, and have end boxes surrounding and loosely receiving the shaft 8, while the gear 14, is arranged between the links of the other pair which have end boxes loosely receiving the shaft 9. Without further explanation, it will be obvious to those skilled in the art, that the shaft 9, can be adjusted in the path described and yet the links will maintain the operative driving connection from shaft 8, to shaft 9, whatever the position of shaft 9, in its range of adjustment.

Horizontally disposed housings or frames 16, project forwardly from the upper and lower portions of the frames 1, and are rigidly fixed thereto and form portions of the main frame work of the machine. These housings are formed with horizontally elongated slots or ways 17, receiving the upper and lower boxes 18, in which the shafts 7 and 8, are journaled. Said housings are also formed with the elongated slots or ways 19, parallel with slots 17, and in which the upper and lower boxes 20, of the shaft 9, are confined. Each housing can be formed with one slot 17, receiving corresponding boxes 18, of shafts 7 and 8, and the boxes of each pair can be yieldingly held apart by interposed spring 21, while set screw 22, having hand wheel 23, can be provided to adjust said boxes and the shafts thereof toward each other to control the pressure of the rolls of said shafts on the work. The boxes 20, of shaft 9, are longitudinally adjustable in slots 19, and are yieldingly held toward the inner ends of the slots by coiled springs 24. The outer ends of the said various slots or ways of the housings can be closed by front plates or bars 25, rigidly secured to the front edges of the housings and carrying the pressure adjusting screws 22, and forming abutments for springs 24. The upper ends of the shafts projecting above the upper boxes 18, 20, can be provided with stop collars 26, resting on said boxes. The shafts 7 and 8, are provided with coöperating opposing metal corrugating (or otherwise shaping) and feeding rolls 27, and 28, fixed to said shafts, respectively, and usually arranged at the lower portions of the shafts and above the lower housing 16. The circumferential coöperating working portions of these rolls can be of any desirable contour or formation according to the work to be done or the shape to be imparted to the sheet metal passed between the rolls. For instance, in the example illustrated, the rolls are designed to longitudinally corrugate metal sheets carried forward by these positively driven rolls, and to form these longitudinal corrugations at a fixed and uniform distance from the adjacent longitudinal edge portions of the sheets so that the corrugations will be throughout their lengths parallel with the adjacent longitudinal edges of the sheets.

Means can also be provided in advance of the bite of the rolls 27, 28, to guide the sheets thereto and maintain the same in proper position with respect to said rolls. For instance, we show sheet supporting and guiding vertical idler wheel, pulley or roll 29, carried by a horizontal idler shaft mounted in bracket 30, fixed to and rising from the side edge of the lower housing 16. This guide wheel is circumferentially grooved to receive the lower longitudinal edge of the flat sheet in advance of rolls 27, 28. An angularly arranged circumferentially grooved thrust-receiving and guiding idler wheel, roll or pulley 31, is arranged in advance of the roll 28, and to the right of the path of movement of the sheets as they enter between rolls 27, 28, and this wheel 31, is carried by a vertically-disposed laterally-inclined idler shaft mounted in vertically disposed bracket 32, fixed to and projecting forwardly from one of the frame sides 1. This inclined wheel is designed to overlap the lower upturned or enlarged edge portion of the sheet as it advances to the corrugating rolls and hold the same down to wheel 29, and sustain the lateral thrust of said sheet. These guide wheels not only hold the sheet against vertical movement from the desired horizontal plane, but maintain the lower portion of the sheet, in advancing to the corrugating rolls, from lateral deflection from the desired vertical plane. The lower portion of the rear roll shaft 9, is provided with a sheet bending or curving roll 33, fixed to and rotating with said shaft. This roll 33, is arranged behind roll 28, and is parallel therewith, and is adapted to be adjusted from right to left and from left to right, into and from the straight path of movement of the sheets passing from between the corrugating rolls 27, 28, to engage the lower portions of the sheets as they leave the corrugating rolls and aid in the production of curved sheets of any desired radius (within certain limits) or to permit the production of sheets wholly or partially straight and flat. This sheet bending and curving roll can be of any desirable contour or surface formation, although it preferably conforms generally to the surface formation produced by the corrugating rolls, and is provided with a circumferential horizontally-projecting lower end lip or flange 33′, to lap under and support and guide the sheet beyond the corrugating rolls. The sheet corrugating and bending or curving rolls thus far described are designed to act on one longitudinal portion of the sheet, the lower portion in the example illustrated, and they are usually fixed against vertical adjustment, and hence we provide a corresponding set of rolls for operating on the opposite longitudinal portion of the sheet and render this set of rolls adjustable toward and from said first named set of rolls to accommodate sheets of different widths. These upper rolls are rotated by the shafts 7, 8, and 9, and are adjustable longitudinally thereof. For instance, the shafts 7, 8, 9, beginning at points above the rolls 27, 28, 33, and terminating below the upper boxes 18, 20, are provided with longitudinal feather keys 34, and upper rolls 35, 36, 37, are longitudinally adjustable on their respective shafts but are held to rotate therewith by said keys, although of course we do not wish to limit our invention to this specific construction.

The rolls 35, 36 are on the shafts 7, 8, respectively, and coöperate to feed, press and shape the upper longitudinal portions of the sheets to the desired conformation, and hence the contours of these rolls will be provided according to the work to be produced thereby, although in the specific example illustrated, these rolls are designed to corrugate the upper portions of the sheet and to bend or curve the upper edge portion of the sheet laterally above the corrugation. The right hand and lateral thrust receiving roll 36, is preferably provided with a circumferential horizontally projecting flange or lip 36′, designed to overhang the top edges of the sheets and receive the upward thrust (if any) of the sheets, and the left hand roll 35, can be correspondingly reduced circumferentially to receive this flange 36′. The upper sheet bending or curving roll 37, can be of any suitable surface contour, usually generally conforming to that of the portions of the sheets to be engaged thereby, and this roll coöperates with the lower roll 33, in bending or curving the sheets laterally.

Various means can be provided for simultaneously adjusting the set of rolls 35, 36, 37, toward and from the opopsite set of rolls and maintaining the same in the desired adjustment. As highly advantageous means for this purpose, we have provided a horizontally disposed vertically adjustable yoke, plate or frame 38, arranged below the top housing 16, and above the working portions of the adjustable set of rolls, and hang these rolls loosely from this yoke so that they are freely rotatable therein but are movable vertically therewith. In the particular example illustrated, we accomplish this result by forming open end or side slots or recesses 39, in the yoke, one for each roll, and form the extended upper ends of the rolls with circumferential grooves or depressions 40, loosely receiving the yoke so that the upper ends of said rolls overhang the yoke and rest and turn on the top face thereof. The rolls enter the slots of the yoke and the grooves of the rolls receive the edge walls of the slots. The slots permit the lateral adjustment of the roll shafts and rolls. This yoke is raised and lowered by a non-rotary vertical screw 41, freely movable vertically through the top housing 16, and at its lower end fixed in or to the yoke to support and move the same. The screw is raised and lowered and held in the desired vertical position by a rotary nut having hand wheel 42, all arranged above said top housing. We preferably mount the nut on a heavy coiled spring 43, interposed between the lower end thereof and the top face of said housing for the purpose of yieldingly supporting the upper set of yokes.

It is well known to those skilled in the art that steel or metal sheets are not always of uniform width throughout their lengths, that the longitudinal edges thereof are not always parallel, and hence an important advantage is attained by so mounting the upper or adjustable gang of rolls as to permit automatic vertical adjustment thereof to accommodate variations in the width of each sheet, or departures of the top edge of the sheet from a straight horizontal line. The upper gang of rolls follows the top longitudinal edge of each sheet and where variations occur the gang of rolls can slightly and automatically rise or fall in following said edge because of the provision of the spring 43, carrying said gang and the fact that the screw 41, is freely movable vertically through the top housing.

It is obvious to those skilled in the art, that the adjustable gang of rolls can be raised or lowered by rotating the hand wheel 42, in the proper direction, to accommodate sheets of different widths within the capacity of a particular machine.

A vertically elongated idler roll 44, is arranged in front of the roll shaft 8, and the upper corrugating roll 36, and parallel therewith, and to the right of the path of movement of the sheets into the machine. At its upper end this roll can be mounted in a bracket 45, fixed to the upper housing 16, and at its lower end in the upper portion of the bracket 32. The lower end of this idler 44, terminates a distance above the angularly arranged guide wheel 31. The sheets enter the machine to the left of this idler and bear against the surface thereof and are guided thereby. The particular purpose of this idler roll is to receive the lateral thrust of the sheets during the rolling or curving action of the rolls 33, 37, and it will be noted that this idler bears against each sheet approximately throughout the full vertical or transverse width thereof and across the intermediate portion thereof between the opposite edge portions being operated on by the two pairs of shaping or corrugating rolls. The two rear curving or bending rolls, when in action, deflect or bend each sheet toward the left, and hence tend to deflect the portion of the sheet in front of and advancing to the corrugating rolls toward the right, but this idler 44, receives this thrust toward the right and keeps the rear portion of the sheet flat and straight.

Various devices can be provided for simultaneously and uniformly shifting or adjusting the positions of the bending or curving rolls 33, 37, with respect to the straight path of the sheets emerging from the shaping or corrugating rolls, to carry said bending rolls to and from bending position and to various bending positions to roll the sheets to the curve of the desired radius. As an advantageous structure and arrangement for this purpose, we show a pair of horizontally disposed push rods 46, extending forwardly through holes in the housings 16, and reciprocatory therein. At their forward ends these push rods abut against the rear ends of the boxes 20, respectively, of the shaft 9. The springs 24, hold these boxes to the push rods. The push rods project beyond the rear ends of the housings and are held by said springs in engagement with the outer spiral edges of similar uniformly arranged volute cams 47, fixed on vertical cam shaft 48, arranged at the rear of the main frame and mounted in suitable boxes carried thereby. Any suitable means can be provided for rotating this shaft to attain the desired position of the cams with respect to the push rods. For instance, we show a manually operated horizontal shaft 49, arranged at the rear of the main frame in suitable boxes and having handle 50, and operatively connected to the cam shaft for rotating the same through the medium of meshing bevel gears 51.

The curved working edges of the two cams are similar in formation and arrangement with respect to the shaft 48, and the push rods so as to simultaneously and uniformly operate the two push rods. The working edge of each cam is of a continuous gradually increasing curve from the lowest end to the highest end thereof, forming an abrupt shoulder between the ends of the edge, and the push rods are arranged radially of the cam shaft with their ends abutting said cam edges. The arrangement is such that when the cams have been rotated to their limit of movement in one direction said abrupt shoulder will laterally engage the push rods and the ends of the rods will bear against the lowest portions of the cam edges and the rods will be at their limits of rearward movement and the roll shaft 9, will be at its limit of movement toward the right and the sheet curving rolls 33, 37, will be out of operative sheet curving position permitting the corrugated shaped metal sheets to issue from the shaping rolls and from the machine in a direct straight line, for the production of flat sheets or sheets flat throughout portions of their length.

Now if it is desired to move the curving rolls toward the left and to sheet bending or curving position, the cam shaft is rotated in the proper direction to cause the curved cam edges of gradually increasing radii to abut and bear against the push rods and thereby force said rods toward the left and push the shaft boxes in the same direction against the tension of springs 24. This operation is continued until the sheet bending and curving rolls are brought to the proper position for curving the sheets to the desired radius. When the cams have been rotated to bring the cam edge ends of greatest radius into engagement with the push rods, the sheet curving rolls will be at their limits of movement toward the left to curve the sheets to the smallest radius possible by the particular machine.

It will be noted that the adjustment is such as to permit the formation of shaped or corrugated flat or straight sheets and of sheets having a curvature of any possible radius between a straight line and the shortest radius within the capacity of the particular machine, and that these adjustments can be made while the machine is in operation. In fact, the adjustment of the curving rolls can be made while the machine is acting on a sheet, to produce a sheet flat or straight throughout a portion of its length and of any desired degree or degrees of curvature throughout the remainder of its length.

It is desirable to provide a visible index for the bending or curving roll adjustment to visually indicate the particular sheet curvature that will be produced by any and every possible adjustment or position of said rolls, together with stop mechanism that can be set by side index to stop the bending rolls in the necessary position to produce the desired sheet curvature. As advantageous means for this purpose, we show an index disk 52, fixed on and rotating with the cam shaft. Around its peripheral portion, this disk is formed with visible uniformly spaced vertical perforations or sockets, 53, to removably receive a pin 54.

55, is a fixed stop secured to any suitable portion of the frame work and depending over the disk and extending into the path of the pin 54. The disk is formed or provided with suitable indicating marks or characters adjacent to each socket 53, indicating the character of sheet (flat or radius of curvature) that will be produced by the machine when the parts are adjusted to bring the particular socket opposite the stop 55, which serves as an index or pointer. In operating the device, the pin 54, is placed in the socket indicating the particular character of sheet desired and when it is desired to have the machine start producing such work, the cam shaft is rotated in the proper direction by handle 50, until the pin 54, engages the stop 55, the bending rolls will then be in the necessary position to produce the work of the required curvature.

A sheet can be started into the machine, with the bending rolls set to curve the sheet to a certain degree of curvature, and when about the desired length of the sheet has been thus curved, and while the machine is still operating on the sheet, the handle 50, can be rapidly turned to withdraw the bending rolls from operative position, so that the remainder of the length of the sheet will issue from the machine straight or flat, or so that a portion of the remainder of the length of the sheet will be formed straight and flat, and before the entire sheet issues from the machine, the handle can be turned in the opposite direction to quickly throw the bending rolls back to operating position to bend and curve the remaining length of the sheet to the desired radius.

It will of course be understood that the sheet can be started into the machine with the bending rolls set to produce a straight length, and then said rolls can be quickly thrown to bending position to bend and curve a portion of the sheet. This matter of shifting the position of the bending rolls while the machine is acting on a sheet, is of peculiar advantage and utility in rolling sheets to form the vertical walls of tanks and the like, having rounded ends and straight or flat sides. The adjustable bending rolls are also of peculiar utility and advantage in bending sheets to form the vertical walls of round tanks or the like, and where such sheets are to be formed, the bending rolls are first set to curve the sheets according to the diameter of the tanks to be produced.

Sheet metal tanks and the like, are manufactured in great variety as to depth, shape, width, and diameter, and hence the utility of the present invention will be apparent to those skilled in the art in view of its wide range of adjustment to receive sheets of different widths and to produce sheets of any degree of curvature between straight sheets and those of a very short-radius curvature, as well as flat sheets and sheets partially flat and partially curved. Furthermore, the machine generally as disclosed, will not only produce flat or curved sheets but will simultaneously and by the one operation, corrugate or otherwise shape the opposite longitudinal edges of the sheets for the production of tanks and other work of superior strength and durability.

Material advantages are attained by the use of a machine capable of corrugating or otherwise shaping and curving or bending flat sheets that have been previously finished at their opposite edges and by other means, to serve as tank walls. For instance, where it is desired to produce the vertical walls of tanks having pipe-inclosing tubular top edges, or even the tubular edges without the stiffening pipes, and with lower edges doubled back to receive the tank bottoms and to be united thereto by pressed or rolled interlocking seams, it is advantageous to be able to take the flat sheets and by suitable means bend or roll the edges thereof to form the stiffening tubular edge with or without the inclosed stiff pipes, and by appropriate machinery to bend the opposite longitudinal portions of the sheets to form the hook-like doubled edges and to then be able to corrugate or otherwise shape said flat partially prepared sheets and bend or curve the same into final form for assembling with the bottoms to form the complete tanks. In Fig. 12, of the drawings, we show such partially prepared flat sheet $a$, at its upper end bent or rolled into a longitudinal tube $b$, inclosing a stiffening body or pipe and at its lower edge doubled back and upwardly into hook form $c$, to receive the correspondingly down turned edge of the tank bottom $d$, for the formation of a rolled or pressed seam to constitute the tight joint in the completed tank (Fig. 14) between the bottom and vertical wall. The present machine will take these flat partially prepared sheets $a$, and finish them to the form shown in Fig. 13, applying the stiffening corrugations $e$, to the upper and lower longitudinal portions thereof, and forming the lower longitudinal edge portions of the sheets with the wide outward, downward and inward curves or bends $f$, to enable the tank bottoms to be applied and locked thereto by the formation of tight rolled or pressed seams $g$, and to provide an otherwise advantageous tank structure. The partially prepared flat sheets $a$, are fed to the machine of the present invention in a reversed position. The idler guide wheels 29, 31, are grooved to receive the tubular edge $b$, of the sheet, and the wheel 31, not only receives the lateral thrust of said tubular edge but also overhangs the same to hold said edge down to wheel 29, and guide the same into the corrugating rolls.

The corrugating rolls 27, 28, are circumferentially grooved at $b'$, above their lower ends, to receive said tubular edge $b$, and prevent distortion thereof, and to hold the sheets by said tubular edges against vertical movement. If so desired, said portions $b'$, of the rolls can serve to completely close, reduce or otherwise finally shape the bead or rolled edge $b$, of the sheet. The vertical grooved idler 29, is usually arranged between the reduced lower ends of the rolls 27, 28, to receive the lower rolled or beaded edge $b$ of the sheet and support and guide the same into the roll grooves $b'$. These tubular edges are thus utilized to constitute means whereby the rolls can positively grip and hold the lower edges of the sheets against being drawn upwardly by the corrugating action of the rolls and to require the formation of the longitudinal corrugations at a fixed uniform distance from and throughout parallel with said tubular edges.

The upper corrugating rolls 35, 36, are formed at the upper parts of their working portions, to provide a recess or space to accommodate and permit the passage of the doubled back edge $c$, without distortion or compression, and yet these rolls are so formed that said recess or space is closed at the top to receive the upward thrust of the sheet edge and hold the same against moving up from the desired path of movement. For instance, this space for the passage of sheet edge $c$, can be provided for by a circumferential depression $c'$, in roll 35, and by the overhanging circumferential portion 36', of roll 36.

The arrangement of the corrugating and shaping rolls 27, 28, and 35, 36 in connection with the thrust sustaining devices, is such that the bending rolls 33, 37, can properly curve the sheets and their tubular and doubled edges without injury thereto or undue distortion thereof.

It is obvious however, that the machine is adapted for work other than the formation of the particular tank wall sheets disclosed.

Of course, it will be understood, that either set of rolls 35, 36 or 27, 28, can be so shaped as not to form corrugations $e$, in the sheets passed therethrough. For instance, we might find it desirable to prepare sheets without the corrugations $e$, near the rolled edge $b$, or without the corrugation $e$, near the lateral curve $f$.

For the purposes of explanation, we have with particularity described various details of structure but we do not wish thereby to limit our invention to such specific arrangements and details.

It is also evident that various changes, variations, and modifications might be resorted to, that elements might be omitted and features added, without departing from the spirit and scope of our invention, and hence we do not wish to limit ourselves to the exact disclosures hereof.

Desiring to protect our invention in the broadest manner legally possible, what we claim is;—

1. In a sheet metal bending machine, in combination, coöperating positively-driven sheet feed rolls, a sheet bending roll in rear thereof and adjustable across the straight path of the sheet from said feed rolls, said feed rolls being recessed to receive previously-formed enlarged longitudinal edges of the sheets and to thereby hold said sheets against edgewise movement in one direction, and guide means receiving lateral and edgewise thrust of the sheets and maintaining them against edgewise movement and to travel in a straight path through said feed rolls.

2. In a sheet metal bending machine, in combination, coöperating positively-driven sheet feed rolls, a sheet bending roll in rear thereof and adjustable across the straight path of movement of the sheets from said feed rolls, means to prevent edgewise movement of the sheet longitudinally of said rolls and to maintain a longitudinal edge of each sheet while passing through said rolls in fixed relation with respect to the axes thereof, and means to maintain the sheet traveling in a straight path while passing forward between said feed rolls.

3. In a sheet metal bending machine, in combination, a pair of vertical coöperating positively-driven sheet feed rolls, sheet bending means in rear thereof, a sheet guiding grooved idler roll arranged at the lower ends of said feed rolls and receiving the lower edges of the sheets, and means coöperating with said grooved roll in guiding the sheets and receiving lateral and edge thrust thereof and maintaining the sheets to travel in a straight path to and between said feed rolls.

4. In a sheet bending machine, in combination, vertical coöperating positively-driven sheet feed rolls, sheet bending means in rear thereof, and means to receive edgewise and lateral thrust of the sheets passing between said rolls and to maintain the sheets to travel in a straight line to and between said rolls comprising a horizontal grooved idler roll at the lower ends of said feed rolls and receiving the lower edges of and upholding the sheets, and an inclined vertically disposed grooved idler roll in advance of and above said horizontal roll and arranged to one side of the path of the sheets to said feed rolls and coöperating with the lower edges of said sheets.

5. Coöperating vertical positively driven rotary sheet feeding rolls having an annular recess and a coöperating annular enlargement and overhang forming a recess to receive an enlarged longitudinal edge of the sheet and prevent upward shifting of the sheet longitudinally of the rolls and transversely of its direction of movement through the rolls, in combination with a vertical positively driven rotary sheet bending roll adjustable to and from operative sheet curving position with respect to said rolls, and means independent of said rolls to sustain and guide the lower longitudinal edge of the sheet.

6. Coöperating positively driven rotary sheet feeding rolls, in combination with a rotary sheet bending roll, manually operated mechanism for shifting said roll to and from operative sheet curving position with respect to said rolls during the sheet feeding and bending operation, and an index and stop device for said mechanism and movable therewith and comprising an abutment in fixed relation with respect to said mechanism, and an index movable with said mechanism and having a manually adjustable stop to coöperate with said abutment in stopping the action of said mechanism when said bending roll has been moved thereby to the position predetermined by the location of said stop.

7. Sheet feeding means, in combination with a rotary sheet bending roll adjustable with respect to said means to curve the sheets passing from said means to any desired radius within the range of adjustment of said roll, a rotary cam acting on said roll to determine the position thereof, said roll being moved throughout its full range of adjustment on each complete revolution of said cam, said cam forcing the roll in one direction, spring means forcing the roll in the opposite direction, and manually-operated means for rotating said cam.

8. Coöperating rotary sheet feeding rolls having parallel axes, in combination with a sheet bending roll arranged in rear thereof and having its axis parallel therewith, and manually controlled mechanism for adjusting said roll to and from sheet curving position with respect to said rolls while maintaining the same parallel therewith, said roll being adjustable independently of and without disturbing the position and operation of said rolls, said mechanism comprising a rotary volute cam of uniformly increasing curvature from its lowest point to its highest point, and a push rod provided with a spring device holding the rod to said cam, said cam on each complete revolution adjusting said roll throughout its complete range of movement and capable of holding the roll at any position within its range of adjustment.

9. Coöperating rotary positively driven sheet feeding rolls, in combination with sheet curving means arranged in rear thereof said adjustable laterally to and from various operative sheet curving positions intersecting the straight path of movement of the sheets from said rolls, whereby either straight shaped sheets or shaped sheets curved laterally to the desired radius, can be produced, and manually operated mechanism for adjusting said means comprising a rotary cam controlling the position of said means and on each complete revolution capable of moving said means throughout its full range of adjustment, and a stop mechanism comprising an index corresponding to and rotating with the cam and provided with an adjustable stop and a coöperating abutment fixed with relation to the index.

10. Straight sheet feeding means, in combination with a sheet bending roll adapted to coöperate with said means to curve the sheets to any desired radius within the range of adjustment, and means whereby said roll can be brought to various positions intersecting the normal straight path of movement of the sheets for producing curved sheets of the desired radius, and whereby said roll can be removed from said path for the production of flat sheets, said last mentioned means comprising a rotary member controlling the position of said roll and on each complete revolution moving the roll throughout its full range of adjustment and provided with an index rotating therewith and having a stop adjustable to any point within its circle of rotation, and a relatively fixed abutment to coöperate with said stop.

11. Means for feeding sheets in a straight path, in combination with a sheet bending roll, a shaft carrying the same, adjustable means carrying said shaft and whereby the same can be moved in a plane intersecting said straight path to carry said roll to and from said path, and manually controlled actuating mechanism for said adjustable means to shift the same to carry said roll to the desired position comprising a rotary volute cam, and an index and stop mechanism comprising an index rotating with said cam and a stop adjustable thereon to any point within its circle of revolution, and a relatively fixed abutment to coöperate with said stop.

12. In combination, in a sheet bending machine, an upright frame, a pair of lower coöperating positively-driven vertical sheet feed rolls, a vertical positively-driven adjustable sheet bending roll in rear of said feed rolls, said three rolls being maintained against longitudinal movement, a pair of vertical coöperating positively-driven upper sheet feed rolls, a vertical positively-driven upper adjustable sheet bending roll in rear of said upper feed rolls, means whereby said three upper rolls are vertically adjustable, said upper and lower sets of rolls adapted to receive and act on the opposite longitudinal edge portions of sheets, and means to maintain the sheets to travel in a straight line to and between the feed rolls and against vertical edgewise movement and for maintaining the longitudinal edges of the sheets in fixed relation with respect to the axes of said feed rolls, said means comprising thrust sustaining guide rolls in advance of said feed rolls.

13. In combination, in a sheet bending machine, an upright frame, a pair of vertical lower sheet feed rolls, an adjustable sheet bending roll in rear thereof, a pair of vertical upper sheet feed rolls, an adjustable sheet bending roll in rear thereof, one of said sets of three rolls being vertically adjusted with respect to the other set of three rolls, means whereby said adjustable rolls are adjusted together as a gang, a vertical idler roll carried by said frame in advance of said feed rolls to receive the lateral thrust of the sheets passing between said rolls and to maintain said sheets to travel in a straight line while passing between said feed rolls, and means to prevent vertical edgewise movement of the sheets while passing to and between said feed rolls comprising an idler roll in advance of the feed rolls and receiving the edges of the sheets.

14. In a sheet bending machine, in combination, means to feed forward and shape the longitudinal edge portions of sheets and to bend said sheets longitudinally, embodying opposite sets of rolls to act on the longitudinal edge portions only of each sheet, said sets of rolls being spaced a distance apart and the rolls thereof having common axes, each set of rolls comprising coöperating positively-driven feed rolls and a sheet bending element adjustable across the straight path of movement of the sheets through the feed rolls, means whereby one set of rolls is adjustable as a gang toward and from the other set of rolls, to accommodate sheets of different width, and sheet engaging and guiding means for sustaining the edge and lateral thrusts of the sheets while passing through the feed rolls and for maintaining said sheets against edgewise movement and to travel in a straight line between said feed rolls.

15. Sheet feeding rolls, in combination with a bending roll shaft, a bending roll carried thereby, spring-held adjustable boxes carrying said shaft, and manually controlled means for adjusting said boxes to bodily carry said shaft laterally to adjust said bending roll to and from sheet curving position with respect to said feeding rolls, said manually controlled means comprising a cam shaft having rotating means, volute cams rotated by said cam shaft, and push rods engaging said cams and moved thereby and engaging said boxes and determining the positions thereof.

16. In a machine for producing either curved or straight shaped sheets, a laterally adjustable rotary sheet bending roll, a manually operated rotary roll-adjusting shaft, means operatively connecting said shaft and said roll for moving and determining the lateral position of said roll, an index disk on and rotating with said shaft and having a stop pin adjustable therearound, and an index stop projecting into the path of said pin to stop said shaft when rotated in either direction at any predetermined point within a complete revolution.

17. In a machine for producing either curved or straight shaped sheets, a laterally adjustable rotary sheet bending roll, a rotary roll-adjusting shaft provided with means for manually rotating the same, means whereby said roll will be moved throughout its full range of lateral adjustment on a complete revolution of said shaft and whereby said roll will be held for operation at any point within its said range of adjustment, an index disk rotating with said shaft and having a stop adjustable thereon to any roll indicating position thereof within its circle of rotation, and a fixed index stop to engage said adjustable stop and stop rotation of the disk and shaft when the roll has reached its desired position.

18. Rotary coöperating sheet feeding and bending rolls, in combination with means to effect relative adjustment of said rolls for the production of straight sheets or curved sheets comprising a rotary shaft, manually operated means for rotating said shaft, a rotary cam on said shaft determining said adjustment, an index disk on said shaft and rotating with said cam and corresponding thereto and having an adjustable stop, and a fixed stop projecting into the path of movement of said adjustable stop.

19. Coöperating sheet feeding, shaping and bending rolls embodying means abutting longitudinal edges of the sheets to receive edgewise thrust of the sheets in combination with parallel driving shafts for and on which said rolls are freely movable longitudinally, and means coupling said rolls together to render them movable longitudinally of said shafts as a gang.

20. Coöperating rotary sheet shaping rolls providing circumferential recesses to receive the previously shaped enlarged, opposite longitudinal edge portions of the sheet, in combination with a pair of idler rolls in advance of said previously mentioned rolls and guiding the sheet thereto, one of said idler rolls receiving a longitudinal enlarged edge of the sheet to sustain the edgewise thrust and the other idler roll being arranged at an angle and having a flange engaging said enlarged edge of the sheet to hold the same toward said first mentioned idler roll.

21. Coöperating rotary vertical sheet feeding rolls in combination with a horizontal sheet edge engaging idler wheel in advance of the lower ends of said rolls, and an angularly arranged sheet edge engaging and lateral thrust sustaining idler wheel in advance of said rolls to lie beside the path of the sheet to said feeding rolls and to engage the enlarged lower edge of the sheet resting on said horizontal wheel.

22. Coöperating rotary sheet feeding and shaping rolls formed with a sheet edge engaging portion receiving the edgewise thrust of the sheets passing between the rolls and means yieldingly supporting said rolls and rendering them freely movable longitudinally together as a gang, in combination with sheet guiding means holding the same against edgewise movement in either direction.

23. Coöperating rotary positively driven sheet feeding rolls having opposite circumferential depressions to receive a previously formed enlarged longitudinal sheet edge without distorting the same, in combination with guiding means in advance of said rolls to engage said enlarged sheet edge and consisting of a transversely arranged grooved idler wheel between the ends of said rolls and receiving said enlarged sheet edge, and an angularly arranged grooved idler wheel arranged at one side of the path of the sheet and engaging said enlarged edge to hold the same against movement from said transversely arranged idler wheel.

24. Coöperating rotary positively driven sheet feeding and shaping rolls formed to receive opposite portions of a sheet previously formed with a longitudinally folded edge and with an opposite tubular longitudinal edge, said rolls being formed to provide recesses to receive said edges without distorting the same, one of said rolls having an annular projecting flange 36′, to overhang one longitudinal edge of said sheet and receive the edgewise thrust thereof in one direction, and a transversely-arranged idler wheel receiving the opposite longitudinal edge of said sheet to receive the edgewise thrust of said sheet in the other direction.

25. Opposite pairs of coöperating rotary positively driven sheet feeding and shaping rolls formed to receive opposite portions of a sheet previously formed with a longitudinally folded edge and with an opposite enlarged longitudinal edge, said rolls being formed to provide recesses to receive said edges without distorting the same, one pair of said rolls being freely movable longitudinally and together toward the opposite pair and provided with adjusting means comprising a yielding support in combination with sheet bending means arranged in rear of said rolls and adjustable transversely of the line of feed of the sheet from the rolls and into engagement with said sheet to curve the same laterally.

26. Coöperating positively driven rotary sheet corrugating rolls freely movable longitudinally and yieldingly held against such longitudinal movement and formed to longitudinally corrugate a sheet having a folded over longitudinal edge, said rolls being circumferentially recessed to form a space receiving said edge without distorting the same, one roll having a projecting circumferential flange overhanging said space to receive the edgewise thrust of said edge without distorting the same.

27. Two gangs of coöperating positively driven rotary sheet feeding and shaping rolls, and means whereby said gangs are adjustable toward and from each other to receive sheets of different widths comprising a yielding support for one of said gangs rendering the same freely movable longitudinally, said gangs simultaneously and longitudinally acting on opposite portions of the sheet fed therethrough.

28. Two gangs of coöperating positively driven rotary sheet feeding and shaping rolls, and means whereby said gangs are adjustable toward and from each other to receive sheets of different widths, said gangs simultaneously and longitudinally acting on opposite portions of the sheet fed therethrough, in combination with rotary positively-driven sheet bending rolls arranged in rear of said feeding rolls and coöperating therewith to curve the sheets laterally as they issue from said feeding rolls, said bending rolls being included in said gangs, respectively, means rendering one of said gangs freely movable longitudinally in following the edge of the sheet and means for adjusting said bending rolls laterally and transversely of the direction of feed of said sheets.

29. In combination, elongated parallel positively driven rotary feed roll shafts, an elongated rotary positively driven bending roll shaft arranged in rear of and parallel with said first mentioned shafts, means for adjusting said bending roll shaft bodily and laterally independently of said first mentioned shafts, coöperating sheet feeding and bending rolls carried by corresponding ends of said shafts, another set of coöperating sheet feeding and bending rolls arranged at opposite corresponding portions of said shafts, one set of said rolls being adjustable longitudinally of said shafts, and means receiving said adjustable set of rolls for moving them longitudinally together as a gang and provided with manually operated means for adjusting the same and maintaining the rolls in the desired adjustment.

30. A pair of parallel rotary positively driven feed roll shafts, a positively driven rotary bending roll shaft arranged in rear of said first mentioned shafts and rotating in unison therewith, means for bodily adjusting said bending roll shaft laterally and independently of said first mentioned shafts, a gang of coöperating rotary sheet feeding and bending rolls fixed to and arranged at corresponding ends of said shafts, another gang of coöperating rotary sheet feeding and bending rolls driven by and arranged at corresponding opposite portions of said shafts and adjustable longitudinally thereof, means for adjusting said last mentioned gang, and a longitudinally arranged sheet guiding idler roll parallel with and arranged in advance of one of said feed roll shafts and mounted independently thereof and of the rolls thereon to receive the lateral thrust of the sheet while being bent laterally by said bending rolls.

31. Parallel rotary shafts, means for simultaneously and positively rotating the same, a gang of coöperating rotary sheet feeding and bending rolls arranged on and rotated by said shafts and longitudinally adjustable thereof, a frame adjustable longitudinally of said shafts, said rolls rotating independently of said frame and coupled thereto to move longitudinally therewith, and a screw and adjusting means for adjusting said frame and maintaining the same in the desired adjustment.

32. Two gangs of simultaneously, constantly, uniformly and positively driven coöperating rotary sheet feeding and bending rolls arranged to receive the opposite edge portions of straight sheets and feed the same forwardly and longitudinally and shape said edge portions of said sheets and then bend said sheets laterally to curve the same to the desired radius, in combination with manually-operated yieldingly-supported means whereby one gang of said rolls is adjustable toward and from the other to receive sheets of different widths, and mechanism whereby the bending rolls of both gangs are simultaneously and uniformly adjustable transversely of the path of movement of the sheets from the feeding and corrugating rolls and independently thereof and while all of the rolls of said gangs are in operation.

33. Two sets of alined, parallel constantly driven, rotary sheet feeding and shaping rolls spaced apart to receive and simultaneously and longitudinally shape the opposite edge portions of a sheet fed forward by said sets of rolls, sheet bending means behind both sets of rolls to coöperate therewith in curving said sheets laterally, means for adjusting said bending means to and from operative bending position and to various bending positions to produce straight shaped sheets or shaped sheets of various degrees of curvature, means in advance of said feeding rolls to sustain the lateral thrust of said sheets while being bent, actuating connections for said various rolls for constantly rotating the same independently of and during said adjustment of said bending means, and adjusting means whereby said sets of rolls and bending means can be adjusted to receive and operate on sheets of different widths.

34. In combination, opposite sets of alined, coöperating, positively driven, rotary sheet shaping and bending rolls, means whereby the distance between said two sets of rolls can be varied to receive sheets of different widths, and means whereby a set of said rolls can automatically move axially in following the uneven edges of sheets being acted on by the rolls.

35. A pair of coöperating rotary sheet feeding rolls, another pair of coöperating rotary sheet shaping rolls in axial alinement with said first mentioned pair of rolls and rotating in unison therewith, said pairs of rolls arranged to receive opposite edge portions of a sheet and to feed the same forward and longitudinally act on the edge portions along lines parallel with the adjacent edges thereof, in combination with adjusting means whereby the distance between said pairs of rolls can be varied to accommodate sheets of different widths, one pair of said rolls being yieldingly held in longitudinal adjustment to permit automatic axial yielding thereof in following uneven sheet edges.

36. In combination, a pair of parallel rotary driven shafts, a pair of coöperating rotary rolls fixed thereon and having their working faces formed to receive a longitudinal portion of a sheet, another pair of coöperating rotary rolls rotating with and longitudinally adjustable on said shafts and having their working faces formed to shape a longitudinal portion of said sheet opposite the portion shaped by said first mentioned rolls, means for longitudinally adjusting said second pair of rolls comprising an adjusting screw freely movable longitudinally with said rolls and provided with an adjusting nut, and a spring abutment for said nut, substantially as described.

37. A lower set of positively and continuously driven rotary vertical rolls comprising a pair of sheet feeding rolls and a sheet bending roll in rear thereof, a vertically adjustable upper set of positively and continuously driven rotary vertical rolls comprising a pair of sheet feeding and shaping rolls alined and rotating with the corresponding rolls of the lower set and a rear sheet bending roll alined and rotating with the lower bending roll, means for supporting, driving and adjusting said rolls, a front vertical idler and lateral thrust sustaining roll, and front sheet upholding, guiding and lateral thrust sustaining means in advance of the lower set of rolls and adapted to engage the lower edge of a vertically disposed sheet passing to and between the upper and lower sets of rolls.

38. Opposite sets of alined rotary positively driven rotary coöperating sheet feeding rolls having their working faces formed to simultaneously and longitudinally receive opposite longitudinal edge portions of a sheet fed forward and between said rolls of each set, the rolls of one of said sets being yieldingly supported and correspondingly formed at their working faces to longitudinally form one edge portion of the sheet with a curved lateral bend and one of said rolls having an annular projecting portion to overhang said edge of the sheet, in combination with supporting and actuating means for said rolls.

39. In combination, an upright frame having upper and lower horizontally-disposed housings, a drive shaft, a pair of parallel vertical rotary shafts, boxes therefor arranged in said housings, gearing for positively driving both shafts and operatively connecting the same with said drive shaft, a rear vertical rotary shaft, boxes therefor adjustably arranged in said housings, expansion gearing constantly driving said rear shaft from one of said first mentioned shafts whatever the position thereof within its range of adjustment, a rotary vertical adjusting shaft carried by said frame, operative connections between the same and the boxes of said rear shaft for adjusting said boxes and rear shaft, a pair of coöperating sheet receiving rolls above the lower housing and fixed on the lower portions of said pair of shafts, a sheet bending roll behind said shaping roll and fixed on said rear shaft, a pair of upper coöperating sheet receiving rolls below the upper housing and rotated by and longitudinally adjustable on said pair of shafts, an upper sheet bending roll behind said upper shaping rolls and rotated by and longitudinally adjustable on said rear shaft, a yoke in which said three upper rolls are rotatable and in which said bending roll is laterally adjustable and by which said three rolls are, as a set, vertically adjustable, and means for adjusting said yoke vertically.

40. In combination, coöperating positively-driven rotary sheet-feeding and shaping rolls, means for guiding sheets thereto and receiving the lateral and edgewise thrust thereof and maintaining the sheets against edgewise movement between said rolls and to travel in a straight line to and between said rolls, a rotary sheet bending roll geared to and positively driven with said feeding and shaping rolls, and manually controlled means for moving said bending roll during the passage of the sheets between said rolls into various sheet curving positions with respect to said rolls to laterally engage the shaped sheets issuing from said rolls.

41. In combination, a pair of parallel rotary shafts positively driven and geared together, a pair of rotary sheet feeding and shaping rolls fixed thereto, another pair of feeding rolls driven by said shafts and freely adjustable longitudinally thereof, a rotary bending-roll shaft arranged in rear of and parallel with said first mentioned shafts, a bending roll fixed thereto, another bending roll driven by and freely adjustable longitudinally of said shaft, means for moving said adjustable feeding and bending rolls together longitudinally of their respective shafts, manually controlled means for shifting said bending roll shaft to carry said bending rolls to and from various operative sheet curving positions with respect to said feeding and shaping rolls, and expansion gearing establishing constant operative driving connections between said bending roll shaft and one of said feeding and shaping roll shafts.

42. In combination, coöperating rotary sheet feeding and shaping rolls having positively-driven rotary shafts and comprising a pair of fixed rolls and a pair of adjustable rolls freely movable longitudinally of said shafts, a bending roll shaft provided with a bending roll fixed thereto and a bending roll behind said adjustable feeding rolls and freely adjustable therewith longitudinally of its shaft, manually controlled means for bodily shifting the position of said bending roll shaft to carry its rolls to and from operative sheet curving position with respect to said feeding and shaping rolls, and expansion gearing between one of said shaping and feeding roll shafts and said bending roll shaft and located between said fixed and said adjustable rolls comprising swingable links loosely mounted on said shafts and pivotally joined at their free ends by a transverse pivot, an intermediate idler gear carried by said links and mounted on said pivot and gears in mesh with said intermediate gear and fixed on said shafts, respectively.

In testimony whereof we affix our signatures in presence of two witnesses.

JOHN F. HOAG.
WILLIAM THOMAS.

Witnesses:
R. H. YALE,
V. O. RANKIN.

Copies of this patent may be obtained for five cents each, by addressing the "Commissioner of Patents, Washington, D. C."